United States Patent
Umansky

(10) Patent No.: US 7,142,550 B1
(45) Date of Patent: *****Nov. 28, 2006

(54) PARTIAL FAX DELIVERY AND MULTICAST BY THE STORE AND FORWARD FAX DEVICES WITH LIMITED MEMORY

(75) Inventor: Ilya Umansky, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/474,935

(22) Filed: Dec. 30, 1999

Related U.S. Application Data

(63) Continuation-in-part of application No. 09/272,811, filed on Mar. 19, 1999, now Pat. No. 6,600,750.

(51) Int. Cl.
*H04L 12/46* (2006.01)

(52) U.S. Cl. ............ 370/401; 370/428; 370/466; 358/1.15; 358/402; 358/407

(58) Field of Classification Search ........ 370/351–356, 370/389, 400, 401, 432, 466–467, 477; 358/1.15, 358/402–407, 425, 440, 468; 379/88.13, 379/88.4, 88.28, 93.05, 93.06, 93.07, 93.14, 379/100.01, 100.08; 714/748, 750
See application file for complete search history.

(56) References Cited

U.S. PATENT DOCUMENTS

| | | | |
|---|---|---|---|
| 4,918,722 A | 4/1990 | Duehren et al. | 379/100 |
| 4,941,170 A * | 7/1990 | Herbst | 379/100.07 |
| 5,291,546 A | 3/1994 | Giler et al. | 379/100 |
| 5,369,686 A | 11/1994 | Dutra et al. | 379/94 |
| 5,488,651 A | 1/1996 | Giler et al. | 379/100 |
| 5,712,907 A | 1/1998 | Wegner et al. | 379/112 |
| 5,767,985 A | 6/1998 | Yamamoto et al. | 358/402 |
| 5,805,298 A | 9/1998 | Ho et al. | 358/402 |
| 5,812,278 A | 9/1998 | Toyoda et al. | 358/402 |
| 5,838,683 A | 11/1998 | Corley et al. | 370/408 |
| 5,859,967 A * | 1/1999 | Kaufeld et al. | 713/200 |

(Continued)

FOREIGN PATENT DOCUMENTS

WO     WO 97/18665     5/1997

*Primary Examiner*—Chi Pham
*Assistant Examiner*—Phuc Tran
(74) *Attorney, Agent, or Firm*—Marger Johnson & McCollom, P.C.

(57) ABSTRACT

An email/fax communication system is disclosed for use in a packet switching network environment including a mail server for storing email messages for transmission thereof, in the form of a fax document, to one or more recipient fax machines. In one embodiment of the present invention, the email/fax communication system is disclosed to include a router for receiving a first email message, in the form of packets, from the mail server, for converting the first email message packets to first fax pages of a fax document and for transmitting the first fax pages to the one or more recipient fax machines. Upon failure to successfully transmit at least one of the first fax pages of the fax document to the one or more recipient fax machines, the router for converting the failed fax pages to secondary email packets for re-transmission thereof to the one or more recipient fax machines, wherein the router behaves as a conventional fax machine by re-transmitting only failed fax pages thereby avoiding re-transmission of the entire fax document.

36 Claims, 6 Drawing Sheets

U.S. PATENT DOCUMENTS

| | | | |
|---|---|---|---|
| 5,872,845 A * | 2/1999 | Feder | 358/442 |
| 5,881,064 A * | 3/1999 | Lin et al. | 370/389 |
| 6,023,345 A * | 2/2000 | Bloomfield | 358/402 |
| 6,219,150 B1 * | 4/2001 | Eguchi | 358/1.15 |
| 6,314,525 B1 * | 11/2001 | Mahalingham et al. | 714/4 |
| 6,411,393 B1 * | 6/2002 | Wakasugi | 358/1.15 |
| 6,417,930 B1 * | 7/2002 | Mori | 358/1.15 |
| 6,487,690 B1 * | 11/2002 | Schuster et al. | 714/752 |
| 6,600,750 B1 * | 7/2003 | Joffe et al. | 370/401 |
| 6,671,061 B1 * | 12/2003 | Joffe et al. | 358/1.15 |
| 2005/0021647 A1 * | 1/2005 | Maeda | 709/206 |

* cited by examiner

PARTIAL FAX DELIVERY AND MULTICAST BY THE STORE AND FORWARD FAX DEVICES WITH LIMITED MEMORY

CROSS REFERENCE TO RELATED APPLICATIONS

This application is a continuation-in-part of a previously-filed U.S. patent application, entitled "EMAIL TO FAX PROCESSING WHEN NO SECONDARY STORAGE IS AVAILABLE", having application Ser. No. 09/272,811, filed on Mar. 19, 1999 now U.S. Pat. No. 6,600,750, the inventors of which are Neil Joffe and Ilya Umansky and the disclosure of which is incorporated by reference herein as though set forth in full.

BACKGROUND OF THE INVENTION

1. Field of the Invention

The present invention relates generally to transmission of an electronic mail (email) message, through a packet switching network, undergoing facsimile (fax) conversion for conversion thereof to a fax document including a plurality of fax pages for receipt by a fax device(s) and particularly to failed fax transmissions wherein a limited number of fax pages are re-transmitted thereby eliminating the need for transmission of the entire fax document.

2. Description of the Prior Art

With the advent of the use of packet switching networks, such as the Internet, various forms of communications of data, voice, audio or a combination thereof have been integrated to allow for the transfer of information in various forms. For example, recently, electronic mail (email), which is used to transfer text, such as files and messages, audio and video, is commonly employed to transfer information between people and equipment located all over the world. Even more recently, email messages (including attached files at times) are converted to facsimile (fax) documents for receipt by fax devices. The transfer of email messages is generally performed through a packet switching network and at some later time, after the email message has been converted to a fax document, the latter is transmitted through a Public Switching Telephone Network (PSTN), such as the telephone company infrastructure.

In a conventional fax transmission environment where fax documents are exchanged between two fax devices without going through a packet switching network, when a fax transmission fails and a subset of fax pages are not successfully delivered to their intended destination, the failed subset of pages are re-transmitted by a fax user. When the sender fax device fails to successfully send all of the pages of a fax document, the sender re-transmits only the pages which failed to be transmitted, rather than re-transmitting the entire fax document. This is possible due to the availability of memory space for storing the entire fax document within a conventional fax device. There is, thus, no need for re-transmission of the entire fax document.

Prior to the invention, in environments where fax documents are generated from email messages wherein the email message travels through a packet switching network environment and the transmission of the fax document results in failure to deliver a subset of the pages thereof (partial fax delivery), the entire fax document is subsequently re-transmitted. This limitation is, in part, due to the lack of secondary memory (or secondary storage space) within equipment, such as routers, used throughout packet switching network environments. Stated differently, routers do not have adequate storage space to maintain the entire fax document therein. This limitation is further due to limitations associated with the Simple Mail Transfer Protocol (SMTP) protocol, a standard protocol employed in communication of email information between various packet switching network equipment, in which either the entire email message is accepted (successfully transmitted) or the message fails and thus must be re-transmitted in its entirety. Thus, when a failure occurs, the entire fax document is re-transmitted by alerting a mail server, which is also included within the packet switching network environment, to re-transmit the original email message. The router generally does not include sufficient memory storage to maintain all of the packets of the email messages or all of the pages of the fax document. Thus, the router cannot act as a conventional fax device.

Yet another problem associated with the transfer of fax-converted email messages is delivery of the fax document to more than one fax device (fax broadcasting). If transmission to one or more fax recipients fails, the following occurs. The remaining pages of the fax document are sent to those fax recipients that are successfully receiving the fax document and transmission is discontinued to those fax recipients that have failed to correctly receive the fax document. The problem with this approach is that fax broadcast is treated no differently than sending a fax document to only one recipient where the mail server is concerned. That is, the router must notify the mail server to re-transmit the fax document for re-transmission thereof, by the router, to the fax recipients that did not receive the fax document. There is no way of keeping track of which fax recipients successfully received the fax document and which did not. Thus, the same fax document is sent to all of the fax recipients repeatedly and if one or more fax recipients fail to correctly receive the fax document during a repeated transmission, the mail server is notified one more time and the fax document is again re-transmitted to all of the fax recipients. As the reader has probably already noted, this can result in an infinite loop with repeated transmissions of the same document to all of the fax recipients. This problem is exacerbated with more fax recipients, i.e., the more fax recipients, the higher the chances of failing with at least one recipient and therefore the more likely it is to enter into an infinite loop problem. An infinite loop problem is clearly intolerable due to many reasons, among which are: waste of processing power by the router, waste of unnecessary paper by the fax recipients in duplicating the same fax document due to repeated fax transmissions, and the like.

Even if the infinite loop problem described above is avoided due to an eventual successful transmission to all fax recipients, a problem still remains. Namely, some of the recipients will have received multiple copies of the fax transmission as a result of retransmissions triggered by a certain subset of the recipients whose transmissions failed. This results in the problems stated above (i.e., waste of router processing power, waste of paper, etc.), and is once more due to the inability to distinguish between those fax recipients that received the fax document successfully and those that did not.

Therefore, the need arises for an apparatus and method for transmitting, to fax recipient(s), only those pages of a fax document that have failed to have been successfully transmitted to their fax recipient(s), the fax document having been created by conversion of an email message to the fax document, the apparatus and method causing a limited number of transmissions thereby resulting in lower costs and less waste to the user of the fax recipient.

SUMMARY OF THE INVENTION

Briefly, an email/fax communication system is disclosed for use in a packet switching network environment including a mail server for storing email messages for transmission thereof, in the form of a fax document, to one or more recipient fax machines. In one embodiment of the present invention, the email/fax communication system is disclosed to include a router for receiving a first email message, in the form of packets, from the mail server, for converting the first email message packets to first fax pages of a fax document and for transmitting the first fax pages to the one or more recipient fax machines. Upon failure to successfully transmit at least one of the first fax pages of the fax document to the one or more of the recipient fax machines, the router converts the failed fax pages to secondary email packets for re-transmission thereof to the one or more recipient fax machines, wherein the router operates as a conventional fax machine by re-transmitting only failed fax pages thereby avoiding re-transmission of the entire fax document.

The foregoing and other objects, features and advantages of the present invention will be apparent from the following detailed description of the preferred embodiments which make reference to several figures of the drawing.

IN THE DRAWINGS

Figure 1:
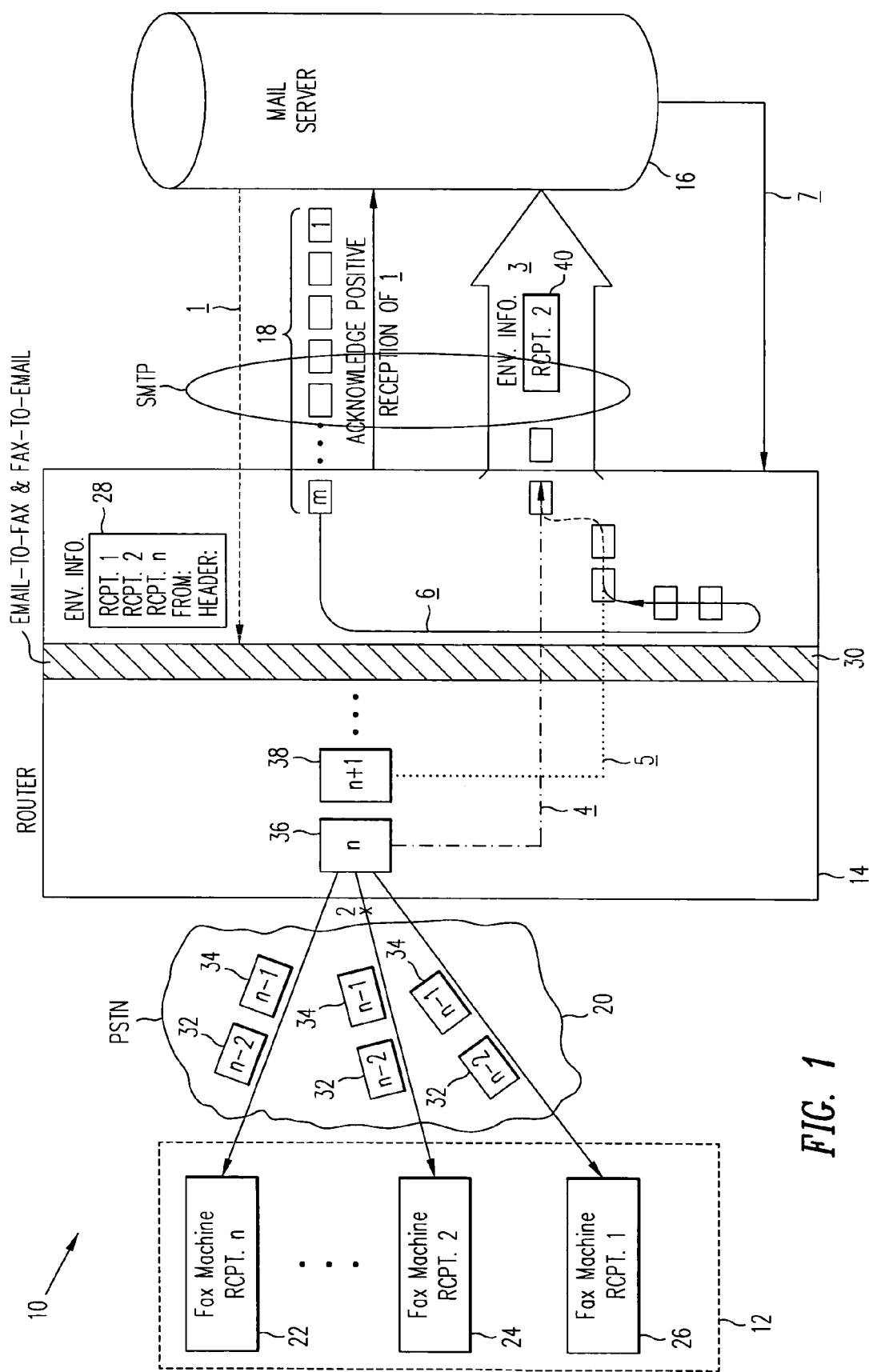
FIG. 1 shows an email/fax communication system 10 in accordance with an embodiment of the present invention.
Figure 4A:
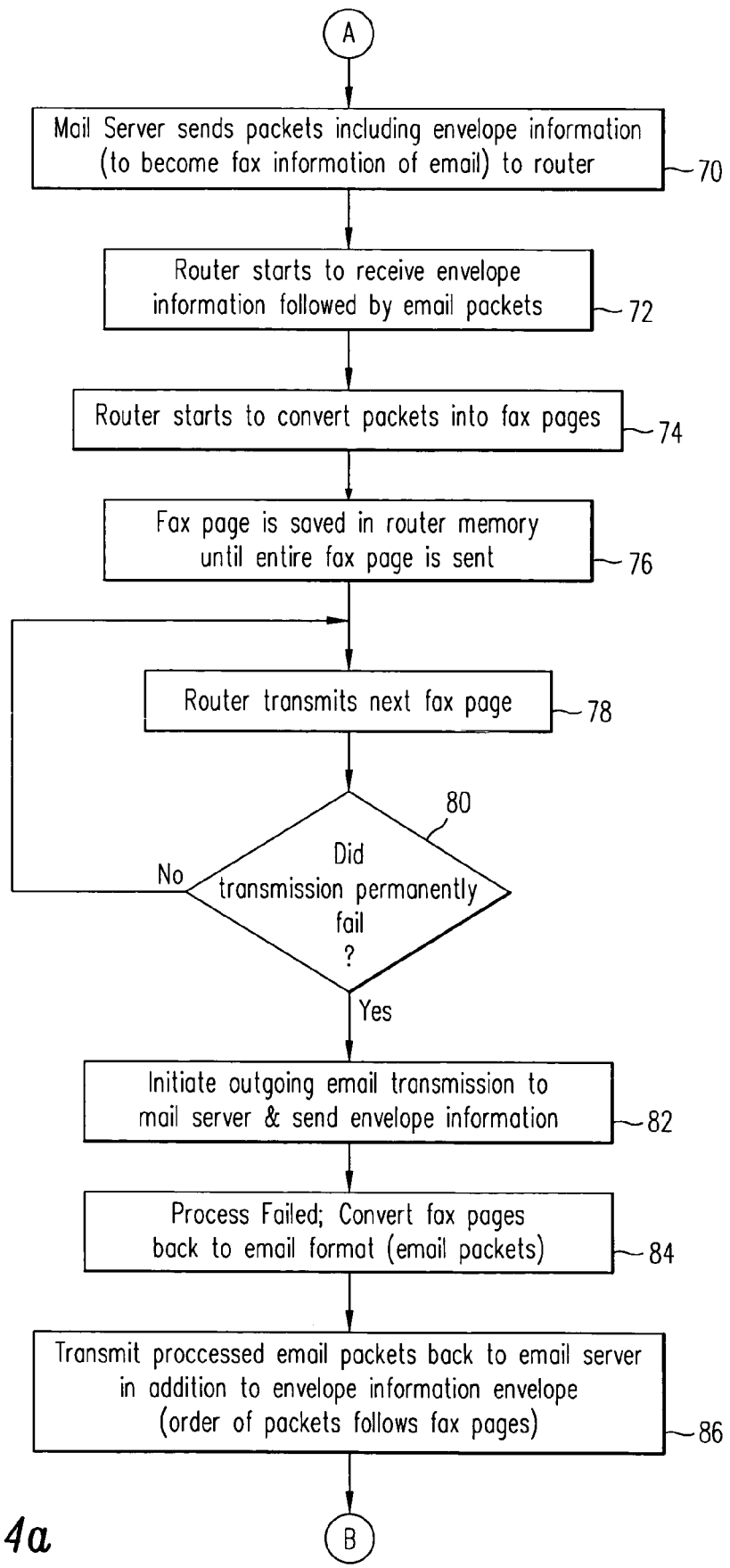
Figure 4B:
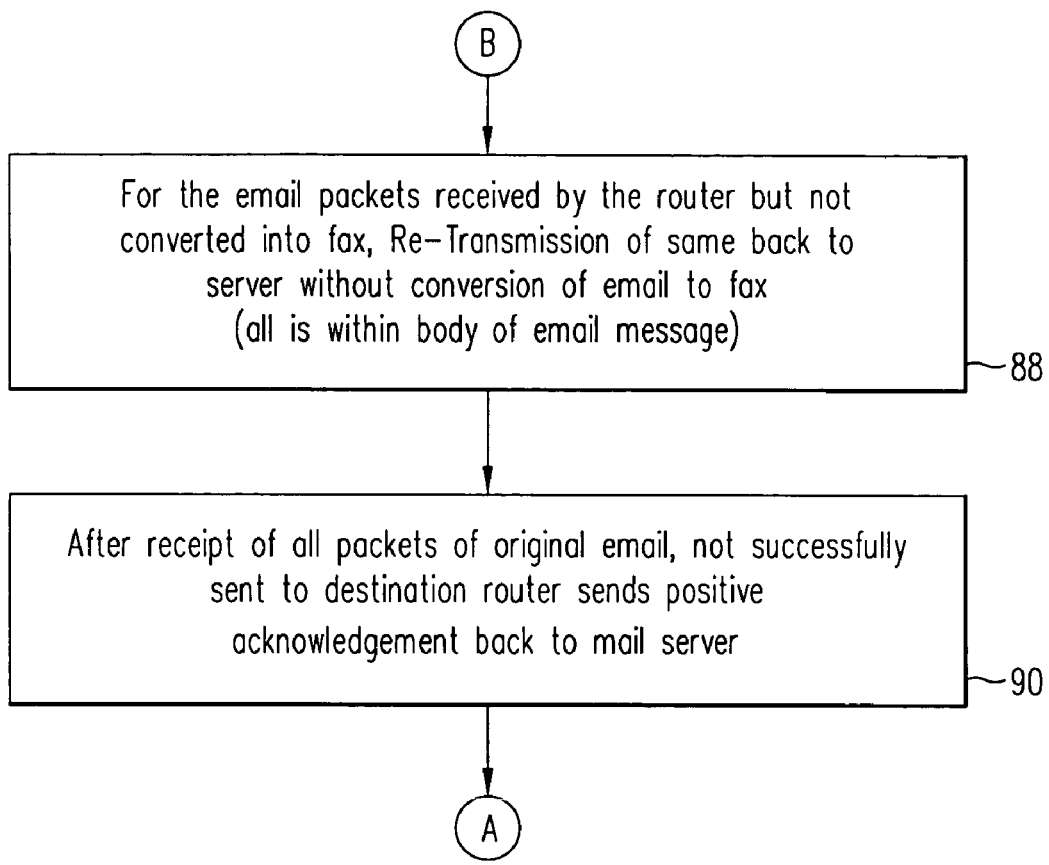

FIGS. 4(a) and 4(b) show a flow chart of the steps described in FIG. 1.

Figure 5:
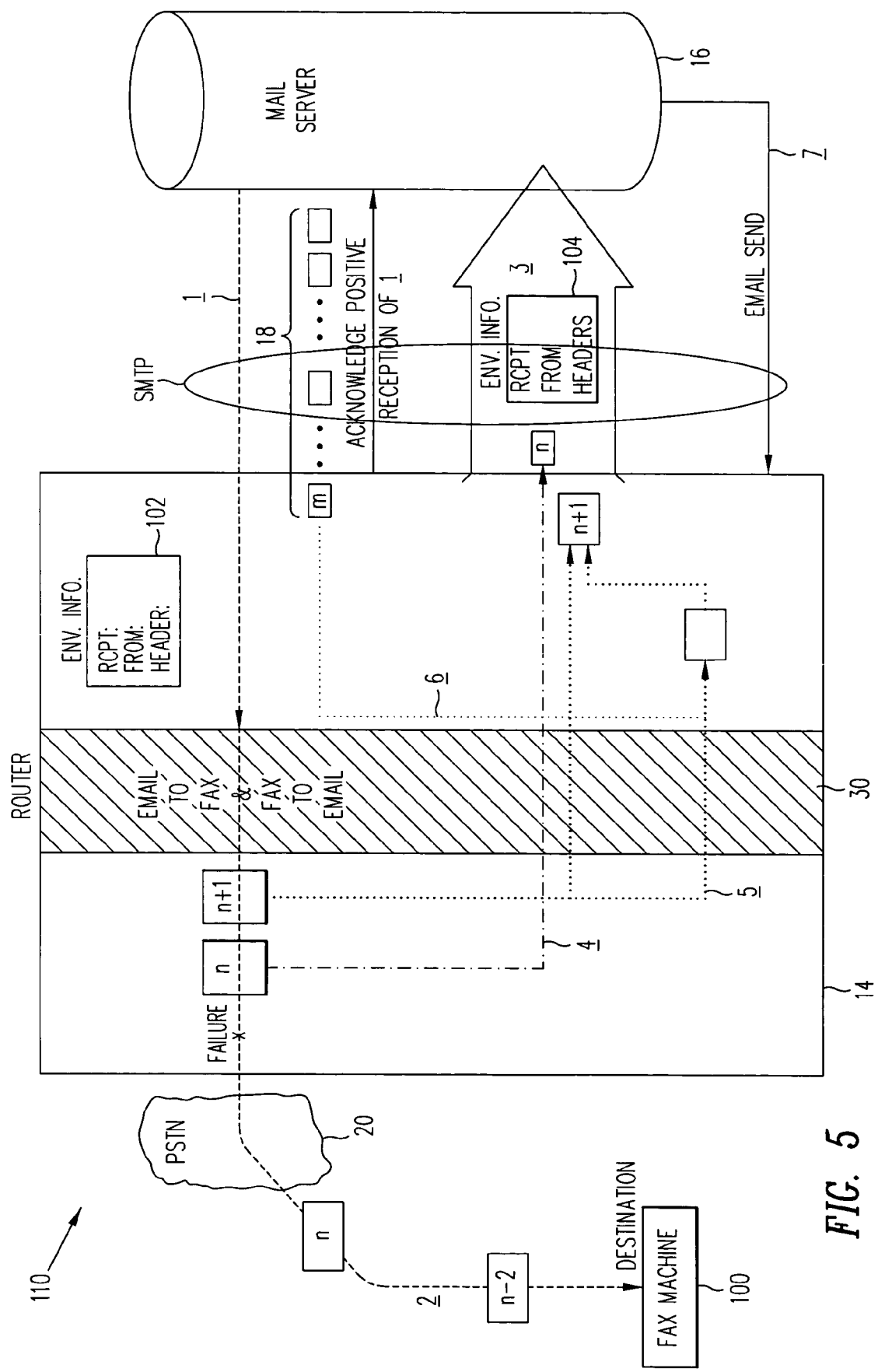

FIG. 5 illustrates another embodiment of the present invention including an email/fax communication system 110.

DETAILED DESCRIPTION OF THE PREFERRED EMBODIMENTS

Referring now to FIG. 1, an email/fax communication system 10 is shown in accordance with an embodiment of the present invention. The email/fax communication system 10 is shown to include a plurality of fax machines 12 in communication with a router 14, which is in communication with a mail server 16. The router 14 is a network device that selects a path that information can take through a packet switching network environment. This requires the router to have an understanding of the network and how to determine the best route for the path.

The mail server 16, in one embodiment of the present invention, is a Personal Computer (PC) with sufficient storage area to maintain a large number of users' email messages. Additionally, the mail server 16 processes the users' email messages, as will be discussed hereinbelow.

The mail server 16 is in communication with the router 14 through a packet switching network (not shown), which may the Internet or other such environments. In FIG. 1, an email message is sent from the mail server 16 to the router 14 in the form of packets. Thus, email packets 18 comprise one email message. With the arrival of each of the email packets 18, the router 14 processes and converts the same to fax information. In FIG. 1, 'm' packets, 'm' being an integer number, is shown to comprise an email message. Each of these packets may be converted to a fax page such that an email message ultimately is received as a multi-page fax document.

Typically, an email message includes envelope information, which is contained in the first packet(s) of the email message. In FIG. 1, envelope information 28 is shown in an expanded view to clearly show the information contained therein. Within the envelope information 28, information regarding the destination of the email message, such as Recipient 1, Recipient 2, . . . , Recipient n, appears in a field recognized by most email users as the "To:" field. Additional information includes the "From:" field, identifying the source of the email message, and header information, which is a description of the email, such as the subject matter thereof. Upon arrival of the packets that include the envelope information 28 at the router 14, the envelope information 28 is saved within the router 14. This is possible due to the minimal space that the envelope information occupies when saved. In other words, while the router does not include secondary memory for saving an entire email message or converted fax information corresponding thereto, it does include sufficient memory for preserving the envelope information and does so until the email message has been successfully transmitted to its designated destinations.

The plurality of fax machines 12 includes fax machine recipient 1 through n, labeled 26, 24 and 22 in FIG. 1. Thus, there are n fax recipients of the email packets 18. The router 14 is in communication with the plurality of fax machines 12 through a Public Switching Telephone Network (PSTN) 20.

As each of the packets of the email message 18 arrive at the router 14, they are converted to fax information at 30 and directed to each of the fax machines of the plurality of fax machines 12. In the example of FIG. 1, fax-converted email packets are shown to be 'n' in number and each of these packets is transmitted to each of the fax machines of the plurality of fax machines 12. For example, a fax-converted email packet n−2 32 is shown to be transmitted to the fax machines 22, 24 and 26, as is a fax-converted email packet n−1 34. As shown in FIG. 1, fax-converted email packets, n 36 and n+1 38, are yet not transmitted from the router 14 to the plurality of fax machines 12.

In operation, consider the case where during transmission of the fax-converted email messages, after successful transmission of n−2 32 and n−1 34 to each of the plurality of fax machines 12, transmission of n 36 to the fax machine 24 fails. Upon such a failure, an email message is re-initiated, this time from the router 14 to the mail server 16. In other words, a secondary email message is transmitted to the mail server 16 with the secondary email message including envelope information packets 40 and all fax pages, in the form of email packets in the same order as originally transmitted, that have yet not been successfully transferred to the recipient fax machines (plurality of fax machines 12). The secondary email message (from the router 14 to the mail server 16) includes identical header information as that included within the original email message (from the mail server 16 to the router 14) except for the "To:" field (recipient) identifying only the failed recipient (fax machine 24). Remaining packets of the secondary email message will only be those that were not sent, as fax pages, to recipient fax machines and thus, will be a subset of the packets of the original email message.

Transmission of the envelope information of the secondary email message from the router 14 to the mail server 16 begins as soon as there is a failure of transmission of any portion of the original email message from the router 14 to the plurality of fax machines 12. Accordingly, if there is no such failure, the secondary email message is never sent to the mail server 16. The mail server 16 does not perform any special processing to accommodate the secondary email message.

In operation, first the router 14 from the mail server 16 receives an email message comprised of a trail of email message packets 18. Next, an acknowledgement is sent back to the mail server, from the router 14, of positive (or successful) reception of the email message packets. There is a "graceful" termination of the connection carrying the email message from the mail server 16 to the router 14. For a detailed explanation of a "graceful" termination, the reader is directed to a previously-filed pending U.S. patent application, entitled "EMAIL TO FAX PROCESSING WHEN NO SECONDARY STORAGE IS AVAILABLE" application Ser. No. 09/272,811, filed on Mar. 19, 1999, the inventors of which are Neil Joffe and Ilya Umansky, the disclosure of which is incorporated by reference herein as though set forth in full. This "graceful" termination informs the mail server 16 of the email message having been received correctly by the router 14. This is somewhat misleading to the mail server 16 because it occurs despite a future failure of transmission of any portion of the email message to the fax machine recipients.

The sequence of events, as they occur, is noted in FIG. 1 by assignment of numbers. That is, at 1, the router 14 from the mail server 16 receives the original email message. Next, at 2, there is a failure to transmit a fax page to one of the plurality of fax machines 12. At 3, a secondary email message is created including the envelope information 40 and all remaining email information (in order of packets, in other words, n 36, in FIG. 1, is re-directed back to the mail server 16 prior to the n+1 38) that has not yet reached all of the fax machines of the plurality of fax machines 12. Fax information (page) that is not sent to the plurality of fax machines 12 for reason of failure and all fax information following the former is converted to email packets within the router 14 at 30 prior to being re-directed to the mail server 16. At 30, a commercially available (or custom-developed) software program, e.g. the Hylafax software program, is used for converting text (email messages) to fax images and vice versa.

In FIG. 1, after 3, at 4, following the envelope information 40, n 36, after being converted to an email packet, is transmitted back to the mail server 16 because it was not successfully sent to the plurality of the fax machines 12. Next, at 5, n+1 38, which is converted to an email packet at 30, is sent back to the mail server 16. Once all of the email packets have been re-directed to the mail server 16, an acknowledgement is sent to the mail server to inform the latter that there is no need for re-transmission of the original email message 18 back to the router 14, otherwise, such as re-transmission will occur. In fact, the next time the mail server sends the email packets for transmission to the fax machines, they may be directed to a router other than the router 14.

Upon receipt of an email message, the mail server 16 stores the message, determines the destination of the email message (from the envelope information) and ultimately sends the email message to its intended destination through a router.

It should be noted that all of the packets of the email message are received by the router because in case there is a failure to successfully transmit some or all of the packets to their destination fax machines, the packets that have not been transmitted to the fax machines are re-directed back to the mail server, as will be apparent shortly.

Figure 2:
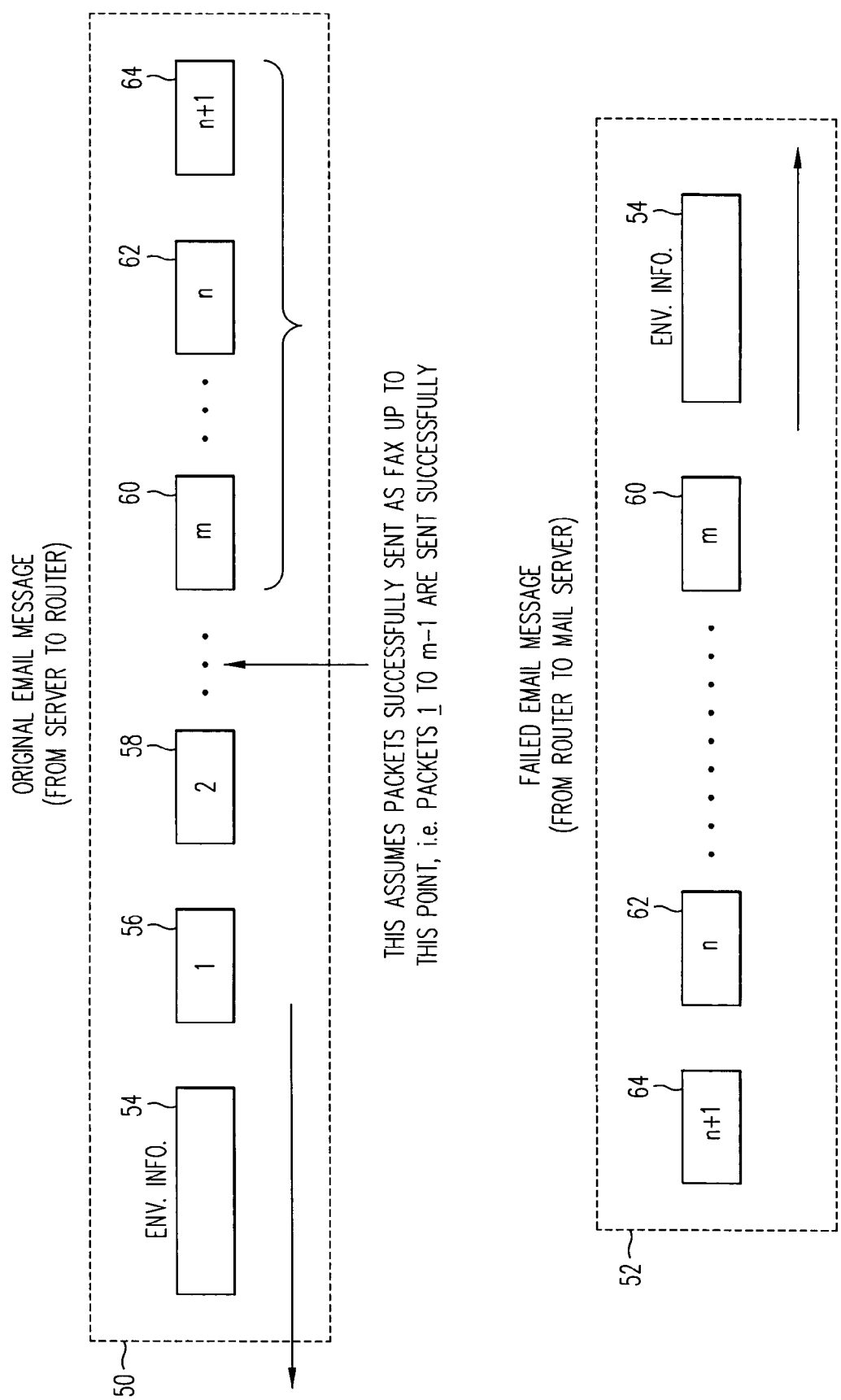
FIG. 2 shows the order of email packets going from a mail server to a router at 50 and the order of packets, after a failed transmission, that are sent from a router back to the mail server at 52 in accordance with an embodiment of the present invention.

FIG. 2 shows the order of email packets going from a mail server to a router at 50 and the order of packets, after a failed transmission, that are sent from a router back to the mail server at 52. At 50, envelope information packets 54 is first sent in front of all succeeding email information packets. Subsequently, the email packets 56 through 64 are sent to the router. Assuming there is a transmission failure of the packet 60, packet 60 and all following packets, i.e., 62 and 64 are sent, following the envelope information 54, from the router back to the mail server.

Figure 3:
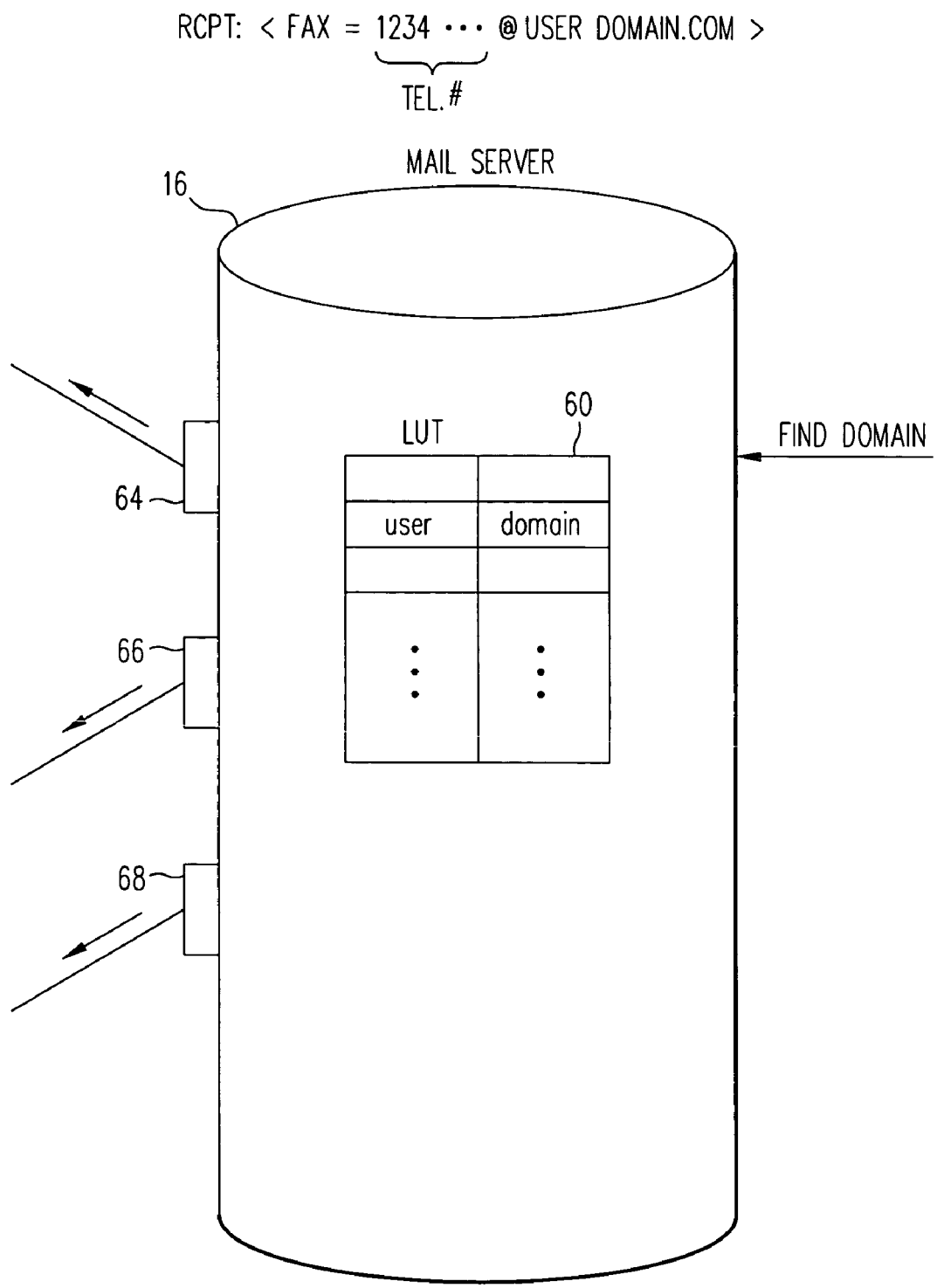
FIG. 3 shows a more detailed view of the mail server 16 of FIG. 1.

FIG. 3 shows a more detailed view of the mail server 16 of FIG. 1. As earlier noted, the mail server determines the destination of a received message in accordance with the information in the "To:" field of the received email message. For example, a recipient is designated by a telephone number, which in the embodiment of FIG. 1 is a fax number of one of the fax machines of the plurality of fax machines 12. The telephone number appears before the "@" sign as a prefix thereof and the suffix of the recipient address is a user domain address. The mail server 16 interprets the domain address, the address to the right of the "@" sign to determine the domain. The mail server 16 includes a look-up-table (LUT) 60 wherein for each domain address, a corresponding user is identified and the email address is then routed through a particular interface 64–68 based upon the user information within the LUT 60. The user domain address may identify the mail server 16 as the place where the email message belongs, in which case, the email message is kept within the mail server 16.

Referring back to FIG. 1, at 6, those email packets that have yet not been transformed to fax information yet need to be sent back to the mail server due to a failed transmission of n 36, are routed back to the mail server 16 without such transformation. Thus, in the sequence of events that take place after a failed transmission is detected, the fax information that has yet to be sent is first converted back to email packets (at 4 and 5) and sent to the mail server 16 followed by the sending of email packets that have not yet been converted to fax information to the mail server, at 6. Accordingly, the router 14 receives all email packets of a particular email message whether or not there is a transmission failure of one or more to destination fax machines. This is because unless all of the packets are received, they can not be sent back to the mail server and it is through the process of sending packets back to the mail server that the packets are again received by a router for re-transmission to destination (or recipient) fax machines.

In FIG. 1, there clearly, there may be more than one fax recipient that failed to successfully receive one or more fax pages. In this connection, the embodiment of the present invention operates in the same manner as described hereinabove. In the event the multiple failures occur at different pages of the fax document that is transmitted to each of the plurality of fax machines 12, there are multiple secondary email messages created and sent to the mail server 16. In fact, there are as many secondary email messages created, as there are fax transmission failures at different page numbers. For example, if one fax machine recipient failed to receive n 36 and another received up to and including n 36 successfully but failed to receive n+1 38, there would be two secondary email messages created. The first secondary email message would be created when the n 36 failure occurred and the second secondary email message would be created when the n+1 38 occurred. In this case, each of the first and second secondary email messages would have different envelope information designating different recipients, i.e. the fax machine that failed to receive the fax page correctly.

Alternatively, if multiple fax machines failed at the same point (the same fax page), one envelope information is created to include multiple recipients, each recipient being a fax machine that failed to receive the fax page.

In FIG. 1, the path 1 is considered to be the "forward connection" in the U.S. patent application cited hereinabove and incorporated herein by reference and the path 3 in FIG. 1 is considered to be the "reverse connection" in the in the U.S. patent application cited hereinabove and incorporated herein by reference.

A fax page is kept in the router memory until the router determines that transmission of the page to each fax machine has succeeded or failed. This is necessary in light of the different speeds associated with different fax machines. For instance, if each of the fax machines of the plurality of fax machines operates at a different speed, then each of these fax machines will receive a particular fax page at a different time. Thus, a fax page must be kept within the router until all of the fax machines have received the same or until the router determines that the transmission has failed for the fax machines that have not yet received the page.

In an alternative embodiment, fax machines of the plurality of fax machines 12 may be grouped according to their respective speeds in order to make the process of email message delivery to fax machines more efficient. In other words, fax machines having similar operating (or receiving) speeds are grouped together wherein all members of the group are sent the same fax page. In this manner, a fax page need not reside within a router's memory for a long period of time to compensate for the slower speed of one or more of the fax machines. Similarly, regardless of speed, fax machines may be grouped together in accordance with which ones are operational so that the ones that are failing are dropped out of the group and dealt with in some other manner. This way, the group only contains operational fax machines thereby reducing maintaining of a fax page in the router's memory. These various approaches for reducing the time needed for a fax page to be stored in the router's memory are important to reducing costs and increasing system performance, in part, due to the expense associated with having memory space with a router.

As a fax machine receives each fax page, a confirmation is sent back. In FIG. 1, each time each of the plurality of fax machines 12 receives a fax page, it sends a confirmation regarding successful receipt of the fax page back to the router 14. In fact, this is how the router is made aware of whether or not a failure has occurred. There are two types of failures associated with fax machines 12. One type of failure is permanent and another is temporary. In the case of a temporary failure, as noted using a protocol widely used by the fax industry, the fax page is re-transmitted upon notification by the failed fax machine whereas in the case of a permanent failure, the fax machine is likely to be dropped as a fax recipient. A secondary email message is created in the case where there is a permanent failure. In the case of a temporary failure, a secondary email message may or may not be created. In other words, the fax machine may notify the router to re-transmit a failed fax page, at which time the router has two choices and can assess the situation to determine which course of action to pursue. One option is to proceed as instructed by the failed fax machine in which case the page which is still in the router memory is re-transmitted to the failed fax machine and a secondary email message is not created. Another option is to hold off on re-transmission of the fax page (perhaps due to excessive growth of router memory usage or other types of limitations) and to re-transmit the fax page at a later point in time, in which case a secondary email message is created.

Communication between the fax machines of the plurality of fax machines 12 and the router 14 is performed utilizing fax protocols commonly known in the industry, such as the T.30 protocol. In FIG. 1, commonly employed protocols by the industry are used to transfer information between the mail server 16 and the router 14, such as Simple Mail Transfer Protocol (SMTP). SMTP is a mail protocol that uses Transport Control Protocol (TCP), which may use Internet Protocol (IP) for communication of information.

In FIG. 1, the router 14 includes a processor (or computer medium), and some type of storage area, a computer-readable medium, for storing software programs for carrying out the various functions discussed herein, such as the fax-to-email and email-to-fax conversion, creation of the secondary email message and the like. The processor executes code from the computer readable medium for effectuating the functions discussed herein.

FIGS. 4(a) and 4(b) show a flow chart of the steps described in FIG. 1. In FIG. 4(a), at step 70, the mail server 16 of FIG. 1 sends email message packets (including envelope information) that are to become fax information to the router 14. Next, at step 72, the router 14 begins to receive envelope information from the mail server followed by email packets containing email message information.

Subsequently, at step 74, the router 14 begins to convert the email packets into fax pages. At step 76, each of the converted email packets is saved into the router's memory, as fax information, until an entire fax page is sent to the destination fax machine (one of the plurality of fax machines 12). It should be noted that each email packet does not necessarily translate into a fax page. That may or may not be the case. More likely however, a fax page is comprised of a group of email packets. At step 78, the router begins to transmit the converted fax page (or a portion thereof (partial fax page) whatever has been converted to date) to a destination fax machine. It should be noted that the router does not discard the fax page (or remove it from its memory) until it has been successfully transmitted.

At 80, it is determined whether or not a fax page has been transmitted correctly by the router. Since it is not clear up until this point in time whether a fax page has been correctly transmitted, the fax page is stored in the router's memory at least until this determination is made at 80. The router includes at least enough memory space to store one page of fax information. If at 80, the router determines that the transmission is successful, the router discards the transmitted pages and transmits further fax pages until all of the fax pages have been transmitted. If, on the other hand, the outcome at 80 yields a failure to transmit correctly to at least one machine, step 82 follows. It should be noted that, if the fax is being sent to multiple destinations and not all transmissions have failed, then the router continues to transmit the remaining fax pages to the destinations that are receiving, while in parallel it performs steps 82 through 90. At step 82, the router 14 initiates outgoing email transmission to the mail server 16 and sends envelope information to the latter (see 3 in FIG. 1). It should be noted that the envelope information 28 (in FIG. 1) is stored within the router 14 for re-transmission thereof to the mail server 16 and the envelope information that is ultimately transmitted to the mail server, i.e. envelope information 40 (of the secondary email message) in FIG. 1, is identical to the envelope information 28 except that the "To:" field information of the envelope information 40 of the secondary email message reflects only failed recipients from the group of all recipients, as discussed earlier. In the special case where there is only recipient of the fax document and one or more pages of the fax document fail to be transmitted correctly, the envelope information of the secondary email message is identical to the envelope information of the original email message.

Next, at step 84, since the process of sending the fax page failed, the failed fax page and all fax pages following thereafter are converted (or processed) back into email packet format (at 30 in FIG. 1). The processed email packets form the secondary email packets that comprise the secondary, email message.

After step 84, at step 86, the processed email packets are transmitted to the mail server 16 (in FIG. 1) from the router 14. The order in which the processed email packets are transmitted follows the order of the fax pages. For example, referring back to FIG. 1, n 36 is transmitted prior to the transmission of n+1 38 and so on. The secondary email message additionally includes the envelope information 40. Next, in FIG. 4(*b*), at step 88, the email packets that were received by the router 14 but not converted into fax information are re-transmitted back to the mail server 16 without undergoing conversion to fax information. The converted (or processed) fax information into email packets (as discussed relative to step 86 of FIG. 4(*a*)) and the email packets of step 88 comprise the secondary email message. Steps 86 of FIGS. 4(*a*) and 88 of FIG. 4(*b*) describe what appears as 3 in FIG. 1 and described hereinabove.

Next, at step 90, after transmission to the mail server 16 of all of the packets of the original email message that have not been successfully sent to their destinations, the router 14 sends a positive acknowledgement back to the mail server 16. Subsequently, at a later point in time, the router 14 receives the secondary email message, in the form of packets, from the mail server 16 again and the process continues from step 70 in FIG. 4(*a*). This path is shown as 7 in FIG. 1. Alternatively, the mail server 16 transmits the secondary email message to a network device other than the router 14. Upon receipt of the secondary email message from the mail server, the router 14 converts the email packets to fax pages and transmits the latter to their fax machine destination, as outlined in FIGS. 4(*a*) and 4(*b*) and discussed hereinabove.

In this respect, the destination fax machines, such as the plurality of fax machines 12, receive only those fax pages that failed to make it to the fax machines. This avoids re-transmission of fax pages that were already transmitted to the fax machines.

In "fax broadcasting", the envelope information includes numerous fax recipients whereas without fax broadcasting, the email message is delivered to one fax destination. The embodiment of FIG. 1 shows an example of a fax broadcasting. FIG. 5 shows another embodiment of the present invention including an email/fax communication system 110 having essentially the same structure as that of FIG. 1 except only one fax recipient, fax machine 110, is shown to received a fax document that is the product of a converted email message. Thus, an envelope information 102, transmitted from the mail server 16 to the router 14, and a secondary envelope information 104, transmitted from the router 14 to the mail server 16, are shown to include only one recipient, i.e. the "To:" filed of the information 102 and 104 only include one input.

In the manner described herein with respect to the various embodiments of the present invention, the router 14 causes transfer of email information to and from fax machines, through a packet switching network, as though two fax machines were communicating with each other even in the event of a failure of one or more of the fax machines to receive a fax page. In other words, much in the same way as conventional fax machines re-transmit only failed pages of a fax document when communicating with each other, only failed portions of an email message are re-transmitted as fax pages using the teachings of the present invention.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A communication system comprising:
 a mail server configured to store one or more email messages; and
 network processing device for converting a first email message from the mail server to facsimile information and transmitting the facsimile information to one or more remote facsimile devices where the network processing device detects a failure in the transmission of the facsimile information to at least one of the remote facsimile devices and transmits a second email message including at least a first portion of the first email message to the mail server responsive to the detected failure;
 wherein the second email message identifies the one or more remote facsimile devices that correspond to the detected failure.

2. The communications system according to claim 1 wherein the first portion of the first email message included within the second email message corresponds to the facsimile information that was unsuccessfully transmitted as a result of the failure.

3. The communications system according to claim 1 wherein the network processing device receives at least some of the information within the second email message back from the mail server, converts the information into facsimile information, and transmits the facsimile information to the one or more identified remote facsimile devices.

4. The communications system according to claim 1 wherein another network processing device receives at least some of the information within the second email message from the mail server, converts the information into facsimile information, and transmits the facsimile information to the one or more identified remote facsimile devices.

5. The communications system according to claim 1 wherein the network processing device detects another failure in the transmission of the facsimile information corresponding to at least one of the remote facsimile devices and transmits a third email message including at least a portion of the first email message to the mail server responsive to the other detected failure.

6. A method for transmitting facsimile information comprising:
 receiving a first email message comprising of first email packets from a mail server;
 converting the first email message packets into fax pages of a fax document; transmitting the fax pages to a recipient fax machine;
 upon failure to successfully transmit the fax pages of the fax document to the recipient fax machine, converting failed fax pages, defined by those fax pages of the fax document that failed to be successfully transmitted to the recipient fax machine, into secondary email packets wherein, upon conversion to fax pages, for transmission thereof to the recipient fax machine; and transmitting one or more of the first email message packets to the mail server for future re-transmission thereof to the recipient fax machine.

7. A method for transmitting facsimile information comprising:

receiving a first email message, in the form of packets;

converting the first email message packets into first fax pages of a fax document;

transmitting the first fax pages to a recipient fax machine;

upon failure to successfully transmit at least one of the first fax pages of the fax document to the recipient fax machine, converting the failed fax pages into secondary email packets for re-transmission thereof to the recipient fax machine; and transmitting one or more of the first email message packets to a destination other than the recipient fax machine.

8. A method as recited in claim 7 further comprising the steps of receiving a first envelope information for identification of the source, destination and header information associated with the first email message and storing the first envelope information.

9. A method as recited in claim 7 including the step of transmitting the first email message to multiple recipient fax machines.

10. A communications system comprising:

a mail server configured to store one or more email messages; and network processing device for converting a first email message from the mail server to facsimile information and transmitting the facsimile information to one or more remote facsimile devices where the network processing device detects a failure in the transmission of the facsimile information to at least one of the remote facsimile devices and transmits a second email message including at least a first portion of the first email message to the mail server responsive to the detected failure;

wherein the first portion of the first email message included within the second email message corresponds to the facsimile information that was unsuccessfully transmitted as a result of the failure;

wherein the network processing device reconverts the unsuccessfully transmitted facsimile information into an email message format for inclusion within the second email message.

11. A communications system comprising:

a mail server configured to store one or more email messages; and network processing device for converting a first email message from the mail server to facsimile information and transmitting the facsimile information to one or more remote facsimile devices where the network processing device detects a failure in the transmission of the facsimile information to at least one of the remote facsimile devices and transmits a second email message including at least a first portion of the first email message to the mail server responsive to the detected failure;

wherein the network processing device detects another failure in the transmission of the facsimile information corresponding to at least one of the remote facsimile devices and transmits a third email message including at least a portion of the first email message to the mail server responsive to the other detected failure;

wherein the third email message identifies which of the remote facsimile devices corresponds to the other detected failure.

12. A device comprising:

a first interface for exchanging one or more email messages with a mail server;

a translator configured to convert a first email message from the mail server into facsimile information; and a second interface for transmitting the facsimile information to one or more remote facsimile devices, where the first interface transmits a second email message that includes at least a portion of the first email message to the mail server responsive to a failure in the transmission of the facsimile information to at least one of the remote facsimile devices;

wherein the second email message identifies which of the one or more remote facsimile devices corresponds to the failure.

13. The device according to claim 12 wherein the portion of the first email message included within the second email message corresponds to the facsimile information that was unsuccessfully transmitted as a result of the failure.

14. The device according to claim 12 wherein the first interface receives the second email message from the mail server, the translator converts the second email message into facsimile information, and the second interface transmits the facsimile information to the one or more identified remote facsimile devices.

15. The device according to claim 12 wherein the first interface transmits a third email message including at least a portion of the first email message to the mail server responsive to the another failure in the transmission of the facsimile information to at least another one of the remote facsimile devices.

16. A device comprising:

a first interface for exchanging one or more email messages with a mail server;

a translator configured to convert a first email message from the mail server into facsimile information; and a second interface for transmitting the facsimile information to one or more remote facsimile devices, where the first interface transmits a second email message that includes at least a portion of the first email message to the mail server responsive to a failure in the transmission of the facsimile information to at least one of the remote facsimile devices;

wherein the portion of the first email message included within the second email message corresponds to the facsimile information that was unsuccessfully transmitted as a result of the failure;

wherein the translator reconverts the unsuccessfully transmitted facsimile information into an email message format for inclusion within the second email message.

17. A device comprising:

a first interface for exchanging one or more email messages with a mail server;

a translator configured to convert a first email message from the mail server into facsimile information; and a second interface for transmitting the facsimile information to one or more remote facsimile devices, where the first interface transmits a second email message that includes at least a portion of the first email message to the mail server responsive to a failure in the transmission of the facsimile information to at least one of the remote facsimile devices;

wherein the first interface transmits a third email message including at least a portion of the first email message to the mail server responsive to the another failure in the transmission of the facsimile information to at least another one of the remote facsimile devices;

wherein the third email message identifies which of the one or more remote facsimile devices corresponds to the another failure.

18. A device comprising:

means for converting a first email message from a mail server into facsimile information;

means for transmitting the facsimile information to one or more remote facsimile devices;

means for identifying a failure in the transmission of the facsimile information to at least one of the remote facsimile devices; and means for transmitting a second email message including at least a portion of the first email message to the mail server responsive to the identified failure;

wherein the second email message identifies which of the one or more remote facsimile devices corresponds to the identified failure.

19. The device according to claim 18 wherein the portion of the first email message included within the second email message corresponds to the facsimile information that was unsuccessfully transmitted as a result of the failure.

20. The device according to claim 18 including means for receiving the second email message from the mail server, means for converting the second email message into facsimile information; and means for transmitting the facsimile information to the one or more identified remote facsimile devices.

21. The device according to claim 18 including means for identifying another failure in the transmission of the facsimile information corresponding to at least one of the remote facsimile devices; and means for transmitting a third email message including at least a portion of the first email message to the mail server responsive to the another identified failure.

22. A device comprising:

means for converting a first email message from a mail server into facsimile information;

means for transmitting the facsimile information to one or more remote facsimile devices;

means for identifying a failure in the transmission of the facsimile information to at least one of the remote facsimile devices;

means for transmitting a second email message including at least a portion of the first email message to the mail server responsive to the identified failure, wherein the portion of the first email message included within the second email message corresponds to the facsimile information that was unsuccessfully transmitted as a result of the failure; and means for reconverting the unsuccessfully transmitted facsimile information into an email message format for inclusion within the second email message.

23. A device comprising:

means for converting a first email message from a mail server into facsimile information;

means for transmitting the facsimile information to one or more remote facsimile devices;

means for identifying a failure in the transmission of the facsimile information to at least one of the remote facsimile devices;

means for transmitting a second email message including at least a portion of the first email message to the mail server responsive to the identified failure;

means for identifying another failure in the transmission of the facsimile information corresponding to at least one of the remote facsimile devices; and means for transmitting a third email message including at least a portion of the first email message to the mail server responsive to the another identified failure;

wherein the third email message identifies which of the one or more remote facsimile devices corresponds to the another identified failure.

24. A method comprising:

converting a first email message from a mail server into facsimile information;

transmitting the facsimile information to one or more remote facsimile devices;

detecting a failure in the transmission of the facsimile information to at least one of the remote facsimile devices; and transmitting a second email message including at least a portion of the first email message to the mail server responsive to the detected failure;

wherein the second email message identifies which of the one or more remote facsimile devices corresponds to the detected failure.

25. The method according to claim 24 wherein the portion of the first email message included within the second email message corresponds to the facsimile information that was unsuccessfully transmitted as a result of the failure.

26. The method according to claim 24 includes receiving the second email message from the mail server, converting the second email message into facsimile information; and transmitting the facsimile information to the one or more identified remote facsimile devices.

27. The method according to claim 24 including detecting another failure in the transmission of the facsimile information corresponding to at least one of the remote facsimile devices; and transmitting a third email message including at least a portion of the first email message to the mail server responsive to the another detected failure.

28. A method comprising:

converting a first email message from a mail server into facsimile information;

transmitting the facsimile information to one or more remote facsimile devices;

detecting a failure in the transmission of the facsimile information to at least one of the remote facsimile devices;

transmitting a second email message including at least a portion of the first email message to the mail server responsive to the detected failure, wherein the portion of the first email message included within the second email message corresponds to the facsimile information that was unsuccessfully transmitted as a result of the failure; and reconverting the unsuccessfully transmitted facsimile information into an email message format for inclusion within the second email message.

29. A method comprising:

converting a first email message from a mail server into facsimile information;

transmitting the facsimile information to one or more remote facsimile devices;

detecting a failure in the transmission of the facsimile information to at least one of the remote facsimile devices;

transmitting a second email message including at least a portion of the first email message to the mail server responsive to the detected failure;

detecting another failure in the transmission of the facsimile information corresponding to at least one of the remote facsimile devices; and transmitting a third email message including at least a portion of the first email message to the mail server responsive to the another detected failure;

wherein the third email message identifies which of the one or more remote facsimile devices corresponds to the another detected failure.

30. An apparatus including a computer-readable medium containing computer instructions that, when executed, cause a processor or multiple communicating processors to perform a method comprising:

converting a first email message from a mail server into facsimile information;

transmitting the facsimile information to one or more remote facsimile devices;

identifying a failure in the transmission of the facsimile information to at least one of the remote facsimile devices; and transmitting a second email message including at least a portion of the first email message to the mail server responsive to the identified failure;

wherein the second email message identifies which of the one or more remote facsimile devices corresponds to the identified failure.

31. The apparatus according to claim 30 wherein the portion of the first email message included within the second email message corresponds to the facsimile information that was unsuccessfully transmitted as a result of the failure.

32. The apparatus according to claim 30 includes receiving the second email message from the mail server, converting the second email message into facsimile information; and transmitting the facsimile information to the one or more identified remote facsimile devices.

33. The apparatus according to claim 30 including identifying another failure in the transmission of the facsimile information corresponding to at least one of the remote facsimile devices; and transmitting a third email message including at least a portion of the first email message to the mail server responsive to the another detected failure.

34. An apparatus including a computer-readable medium containing computer instructions that when executed, cause a processor or multiple communicating processors to perform a method comprising:

converting a first email message from a mail server into facsimile information;

transmitting the facsimile information to one or more remote facsimile devices;

identifying a failure in the transmission of the facsimile information to at least one of the remote facsimile devices;

transmitting a second email message including at least a portion of the first email message to the mail server responsive to the identified failure, wherein the portion of the first email message included within the second email message corresponds to the facsimile information that was unsuccessfully transmitted as a result of the failure; and reconverting the unsuccessfully transmitted facsimile information into an email message format for inclusion within the second email message.

35. An apparatus including a computer-readable medium containing computer instructions that, when executed, cause a processor or multiple communicating processors to perform a method comprising:

converting a first email message from a mail server into facsimile information;

transmitting the facsimile information to one or more remote facsimile devices;

identifying a failure in the transmission of the facsimile information to at least one of the remote facsimile devices;

transmitting a second email message including at least a portion of the first email message to the mail server responsive to the identified failure identifying another failure in the transmission of the facsimile information corresponding to at least one of the remote facsimile devices; and transmitting a third email message including at least a portion of the first email message to the mail server responsive to the another detected failure;

wherein the third email message identifies which of the one or more remote facsimile devices corresponds to the another identified failure.

36. A communications system comprising:

a mail server configured to store one or more email messages; and network processing device for converting a first email message from the mail server to facsimile information and transmitting the facsimile information to one or more remote facsimile devices where the network processing device detects a failure in the transmission of the facsimile information to at least one of the remote facsimile devices and transmits a second email message including at least a first portion of the first email message to the mail server responsive to the detected failure;

wherein the network processing device detects the failure in the transmission of the facsimile information to a first remote facsimile device and continues transmitting the facsimile information to one or more of the other remote facsimile devices.

* * * * *

UNITED STATES PATENT AND TRADEMARK OFFICE
CERTIFICATE OF CORRECTION

| | |
|---|---|
| PATENT NO. | : 7,142,550 B1 |
| APPLICATION NO. | : 09/474935 |
| DATED | : November 28, 2006 |
| INVENTOR(S) | : Ilya Umansky |

It is certified that error appears in the above-identified patent and that said Letters Patent is hereby corrected as shown below:

Column 15, line 48, "that when " should read that --,-- when.

Signed and Sealed this

Twelfth Day of June, 2007

JON W. DUDAS
*Director of the United States Patent and Trademark Office*